US011676320B2

(12) United States Patent
Monroy-Hernández et al.

(10) Patent No.: US 11,676,320 B2
(45) Date of Patent: *Jun. 13, 2023

(54) DYNAMIC MEDIA COLLECTION GENERATION

(71) Applicant: Snap Inc., Santa Monica, CA (US)

(72) Inventors: Andrés Monroy-Hernández, Seattle, WA (US); Yu Jiang Tham, Los Angeles, CA (US)

(73) Assignee: Snap Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/583,988

(22) Filed: Jan. 25, 2022

(65) Prior Publication Data
US 2022/0150198 A1    May 12, 2022

Related U.S. Application Data

(63) Continuation of application No. 17/357,034, filed on Jun. 24, 2021, now Pat. No. 11,270,491, which is a (Continued)

(51) Int. Cl.
G06T 19/00    (2011.01)
G06T 13/40    (2011.01)
(Continued)

(52) U.S. Cl.
CPC ............ *G06T 13/40* (2013.01); *G06F 3/0482* (2013.01); *G06T 19/006* (2013.01);
(Continued)

(58) Field of Classification Search
None
See application file for complete search history.

(56) References Cited

U.S. PATENT DOCUMENTS 5,880,731 A    3/1999    Liles et al.
6,023,270 A    2/2000    Brush, II et al.
(Continued)

FOREIGN PATENT DOCUMENTS

CN    109863532 A    6/2019
CN    110168478 A    8/2019
(Continued)

OTHER PUBLICATIONS

"U.S. Appl. No. 17/030,901, Notice of Allowance dated Mar. 29, 2021", 9 pgs.
(Continued)

*Primary Examiner* — Nicholas R Wilson
(74) *Attorney, Agent, or Firm* — Schwegman, Lundberg & Woessnere, P.A.

(57) ABSTRACT

A computer system receives user selection of an avatar story template. User-specific parameters relating to the user are determined and real-time data, based at least in part on the user-specific parameters, is retrieved. Specific media or digital assets are obtained based on at least one of the real-time data and the user-specific parameters. An avatar story is then generated by combining the avatar story template and the specific media or digital assets. The avatar story is then displayed on a display of a computing device.

18 Claims, 10 Drawing Sheets

Related U.S. Application Data continuation of application No. 17/030,901, filed on Sep. 24, 2020, now Pat. No. 11,080,917.

(60) Provisional application No. 62/908,407, filed on Sep. 30, 2019.

(51) Int. Cl.
*H04N 21/235* (2011.01)
*G06F 3/0482* (2013.01)
*H04L 51/222* (2022.01)
*H04L 51/52* (2022.01)
*H04L 51/046* (2022.01)
*H04L 51/10* (2022.01)

(52) U.S. Cl.
CPC ............ *H04L 51/046* (2013.01); *H04L 51/10* (2013.01); *H04L 51/222* (2022.05); *H04L 51/52* (2022.05); *H04N 21/2353* (2013.01)

(56) References Cited

U.S. PATENT DOCUMENTS

| | | |
|---|---|---|
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,529,028 B1 * | 1/2020 | Davis ..................... G06Q 40/08 |
| 10,573,048 B2 | 2/2020 | Ni et al. |
| 10,657,701 B2 | 5/2020 | Osman et al. |
| 11,080,917 B2 | 8/2021 | Monroy-hernández et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0020661 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |

(56) References Cited

U.S. PATENT DOCUMENTS

| | | |
|---|---|---|
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2021/0097745 A1 | 4/2021 | Monroy-Hernandez et al. |
| 2021/0319612 A1 | 10/2021 | Monroy-Hernandez et al. |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2612139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |

OTHER PUBLICATIONS

"U.S. Appl. No. 17/357,034, Notice of Allowance dated Oct. 26, 21", 10 pgs.

* cited by examiner

DYNAMIC MEDIA COLLECTION GENERATION

CROSS REFERENCE TO RELATED APPLICATIONS

This application is a continuation of U.S. patent application Ser. No. 17/357,034, filed on Jun. 24, 2021, which is a continuation of U.S. patent application Ser. No. 17/030,901, filed on Sep. 24, 2020, which claims the benefit of priority to U.S. Provisional Application Ser. No. 62/908,407, filed on Sep. 30, 2019, each of which are incorporated herein by reference in their entireties.

BACKGROUND

Mobile devices allow users to contact each other, e.g., via telephone calls and short messages (e.g., SMS text messages), and social network-based posts or messages. One issue with users contacting each other via these mobile device-based approaches is that often the communications are generic and inauthentic in nature.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
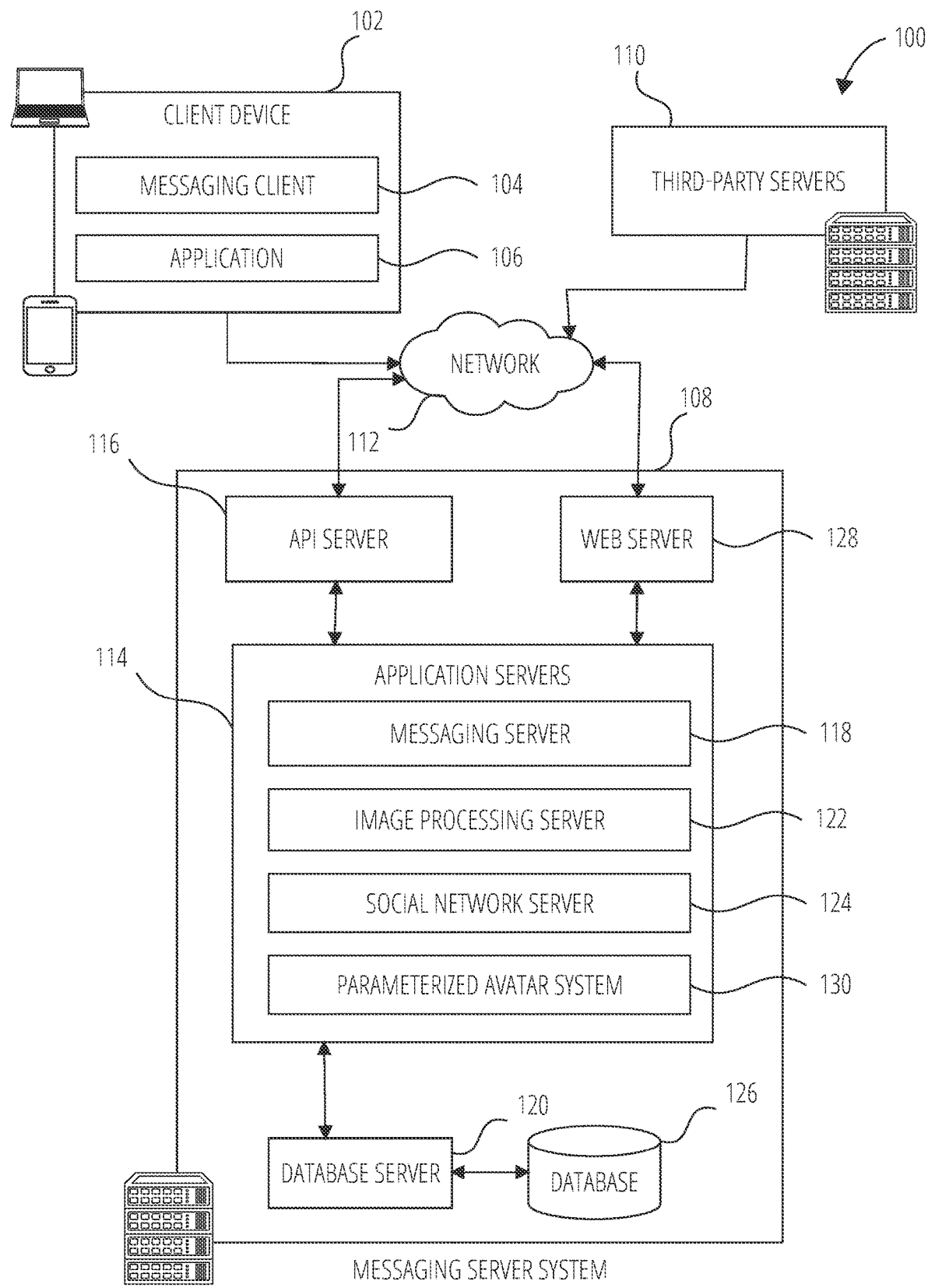
FIG. 1 is a diagrammatic representation of a networked environment in which the present disclosure may be deployed, in accordance with some examples.

Disclosed is a messaging system in which a user's avatar or the avatars of a user's friends can participate in a dynamic visual story that can vary based on a number of different parameters. The avatar story typically progresses through one or more scenes involving action or dialog by or between user avatars. The avatar story may initially be defined by a story template that sets a basic outline for the progression of the story, including for example dialog, actions, plot lines etc. The appearance and progress of the story can vary based on parameters such as active and passive user inputs (e.g. the actual or automatic selection of friends whose avatars will appear in the story, the user's location, time of day, heart rate etc.) and real-time data (e.g. weather conditions at the user's location, etc.). Appropriate media or digital assets for use in the story are then assembled based on the parameters. The media and digital assets are combined with the story template, to present a story that varies in appearance or storyline based on the parameters.

Disclosed is a method, executed by a computer system, comprising receiving user selection, by a user, of an avatar story template, determining user-specific parameters relating to the user, retrieving real-time data based at least in part on the user-specific parameters, obtaining specific media based on at least one of the real-time data and user-specific parameters, generating an avatar story by combining the avatar story template and the specific media, and displaying the avatar story. The computer system may comprise at least one of a client device and a server device.

The user-specific parameters may include a location of the user, the real-time data includes weather conditions at the location, and the specific media includes a representation of the weather conditions. The user-specific parameters may also include a location of the user and the specific media may include a representation of landmarks near the location. The specific media may also include a custom appearance of an avatar corresponding to the user, the custom appearance of the avatar being based on at least one of the user-specific parameters and the real-time data.

Further, the avatar story template may include a data override that specifies a value for the real-time data that is different from a value of the real-time data based on a user-specific parameter. The data override may for example specify a location of the avatar story.

Generation of the avatar story may be performed by a server device. The retrieving of the real-time data and the obtaining of the specific media may also be performed by the server device, and the method may further comprise transmitting the avatar story template and the specific media to the client device; and generating the avatar story on the client device.

Also disclosed is a system comprising one or more processors of a machine and a memory storing instructions for providing a dynamic avatar story. The instructions when executed by at least one processor among the one or more processors, causes the machine to perform operations comprising: receiving user selection, by a user, of an avatar story template, determining user-specific parameters relating to the user, retrieving real-time data based at least in part on the user-specific parameters, obtaining specific media based on at least one of the real-time data and user-specific parameters;, generating an avatar story by combining the avatar story template and the specific media and displaying the avatar story. The system may comprise at least one of a client device and a server device.

The user-specific parameters used in the system may include a location of the user, the real-time data includes weather conditions at the location, and the specific media includes a representation of the weather conditions. The user-specific parameters may also include a location of the user and the specific media may include a representation of landmarks near the location. The specific media may also include a custom appearance of an avatar corresponding to the user, the custom appearance of the avatar being based on at least one of the user-specific parameters and the real-time data.

Further, the avatar story template used in the system may include a data override that specifies a value for the real-time data that is different from a value of the real-time data based on a user-specific parameter. The data override may for example specify a location of the avatar story.

Generation of the avatar story may be performed by a server device in the system. The retrieving of the real-time data and the obtaining of the specific media may also be performed by the server device, and the method may further comprise transmitting the avatar story template and the specific media to the client device; and generating the avatar story on the client device.

Also disclosed are one or more non-transitory machine-readable storage media embodying instructions for providing a dynamic avatar story. The instructions, when executed by one or more devices, cause the devices to perform operations comprising receiving user selection, by a user, of an avatar story template, determining user-specific parameters relating to the user, retrieving real-time data based at least in part on the user-specific parameters, obtaining specific media based on at least one of the real-time data and user-specific parameters, generating an avatar story by combining the avatar story template and the specific media, and displaying the avatar story.

The user-specific parameters may include a location of the user, the real-time data includes weather conditions at the location, and the specific media includes a representation of the weather conditions. The user-specific parameters may also include a location of the user and the specific media may include a representation of landmarks near the location. The specific media may also include a custom appearance of an avatar corresponding to the user, the custom appearance of the avatar being based on at least one of the user-specific parameters and the real-time data.

Further, the avatar story template may include a data override that specifies a value for the real-time data that is different from a value of the real-time data based on a user-specific parameter. The data override may for example specify a location of the avatar story.

Generation of the avatar story may be performed by a server device. The retrieving of the real-time data and the obtaining of the specific media may also be performed by the server device, and the method may further comprise transmitting the avatar story template and the specific media to the client device; and generating the avatar story on the client device.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102. and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, a social network server 124 and a parameterized avatar system 130. The messaging server 118 implements a number of message processing technologies and functions, particularly related to the aggregation and other processing of content (e.g., textual and multimedia content) included. in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
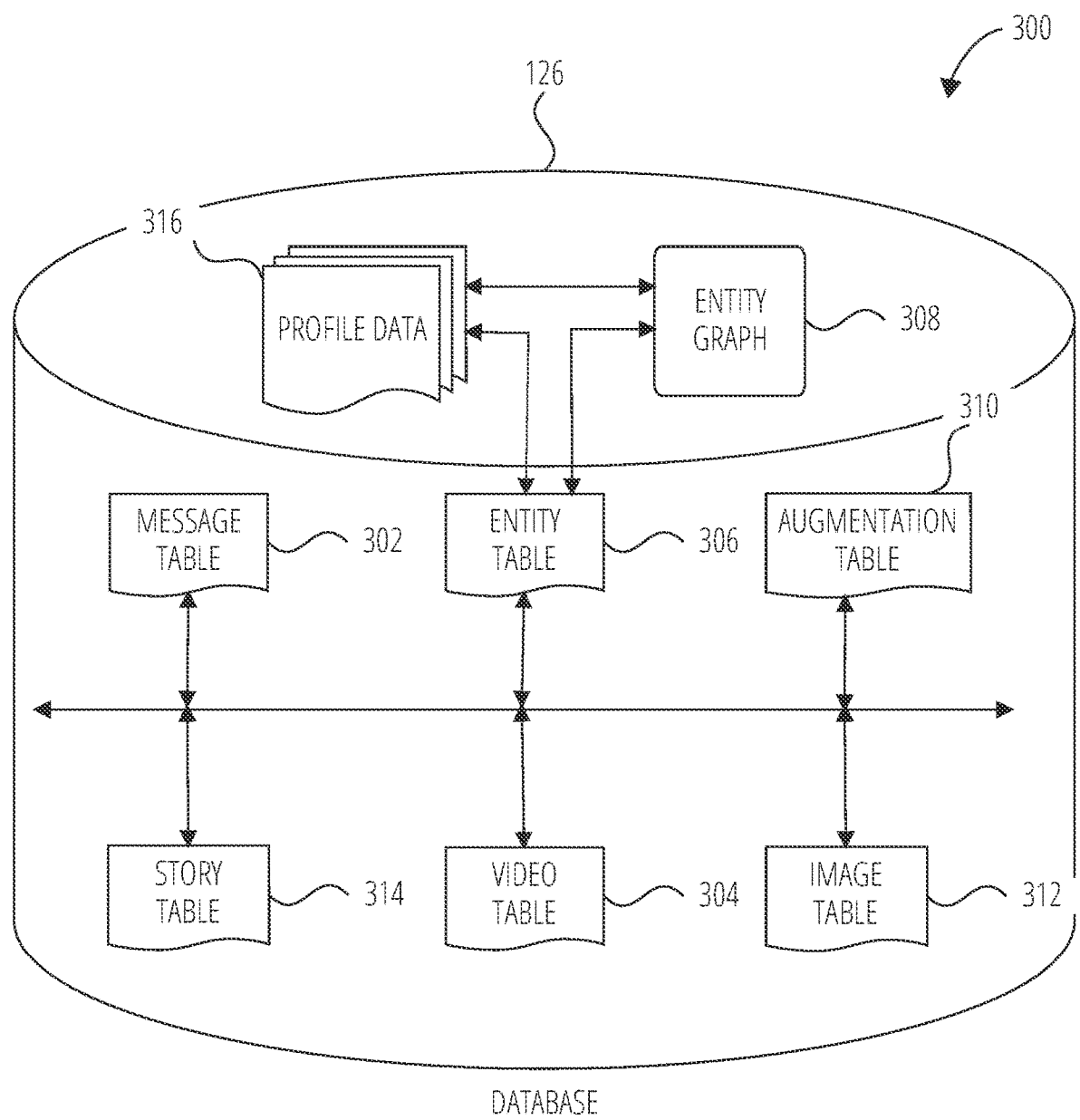
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

The parameterized avatar system 130 performs a number of different functions relating to the generation of the avatar stories described herein. The parameterized avatar system 130 can for example host (e.g. via database server 120 and database 126) a collection of story templates that are available to users of the messaging system 100. The parameterized avatar system 130 can also provide resources for developers of avatar stories, for example development tools and media collections for use in creating story templates. The parameterized avatar system 130 may also take an active role in the generation of avatar stories, for example by receiving a request for a particular story template, by obtaining user inputs and retrieving real-time data based on the user inputs. Using the real-time data and the user inputs, the 130 may gather corresponding specific media assets and data, and populate the specific media assets into the story template to create the avatar story, which may then be transmitted to a client device 102 for presentation to the user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102. (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In some examples, the small-scale version of the application (e.g., an "applet") is a web-based, markup-language version of the application and is embedded in the messaging client 104. In addition to using markup-language documents (e.g., a .*ml file), an apples may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
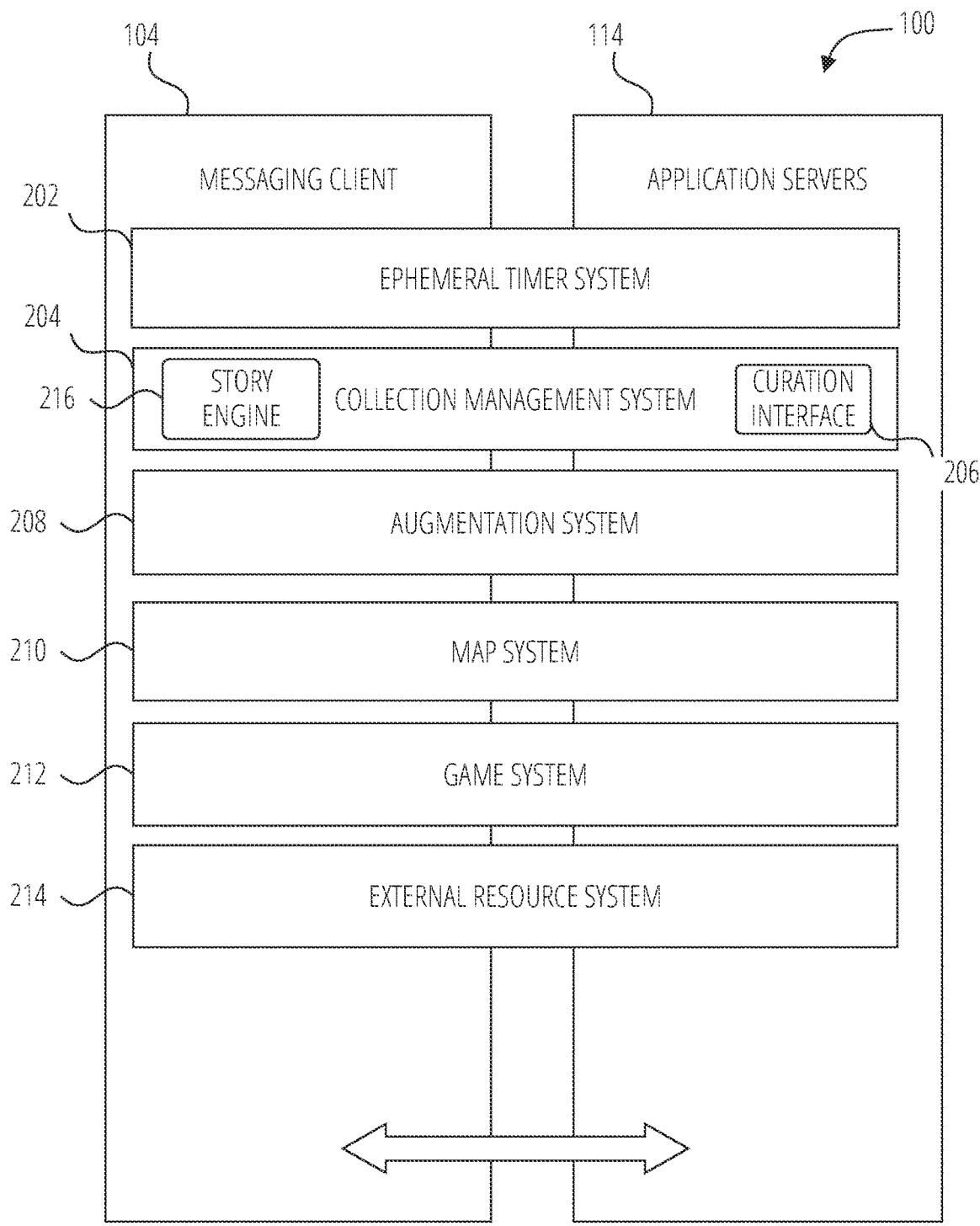
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, a game system 212, and an external resource system 214.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The collection management system 204 also includes a story engine 216. As will be discussed in more detail below with reference to FIG. 5, the story engine 216 receives various inputs, such as a programmatic script or other story template, active and passive user inputs, and real-time data to generate a dynamic parametrized story with varying outputs depending on the variation of the inputs to the story engine 216. The story engine 216 may be implemented as a module of the collection management system 204 or it could be embodied as a separate parametrized avatar system within the messaging system 100. The story engine 216 will also typically reside in the messaging client 104 on the client device 102, but of course aspects and functionality of the story engine 216 may be distributed throughout the messaging system 100.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g. third-party servers 110) to launch or access external resources, i.e. applications or applets. Each third-party server 110 hosts, for example, a markup language (e.g., HTML5) based application or small-scale version of an application (e.g., game, utility, payment, or ride-sharing application). The messaging client 104 may launches a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK. facilitates communication between third-party servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104 the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

The privacy settings in profile data 316 may also determine the extent of customization of the user experience for users of the messaging system 100 and the messaging client 104. For example, as discussed herein with reference to the parametrized avatar story, the appearance of and the direction the story takes can depend on a number of user inputs 502 (see FIG. 5). These can include the user's location, calendar information, friends and their degree of relationship to the user, and even the user's heart rate or heart-rate variability. The messaging client 104 provides an interface for the user to specify or update their privacy preferences, either on setup or in response to a prompt by the messaging client 104 if it determines that the current or proposed activity (e.g. the presentation of a parametrized avatar story) may require or be improved by using user data, the use of which has riot yet been authorized or has previously been denied. Any changes to the privacy settings will be stored in database 126 in the profile data 316. a local copy of which may be included on client device 102. The privacy setting may also differ depending on whether the parametrized avatar story is going to be shown solely to the user of the client device or is going to be shared with one or more friend groups, or is going to be publicly available.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in some examples, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

Additionally, as disclosed herein, the story table 314 and associated content collection may comprise the messages, programmatic scripts, templates, media data and other parameters that permit the presentation of a dynamic parametrized story to a user of client device 102

As mentioned above, the video table 304 stores video data that, in some examples, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
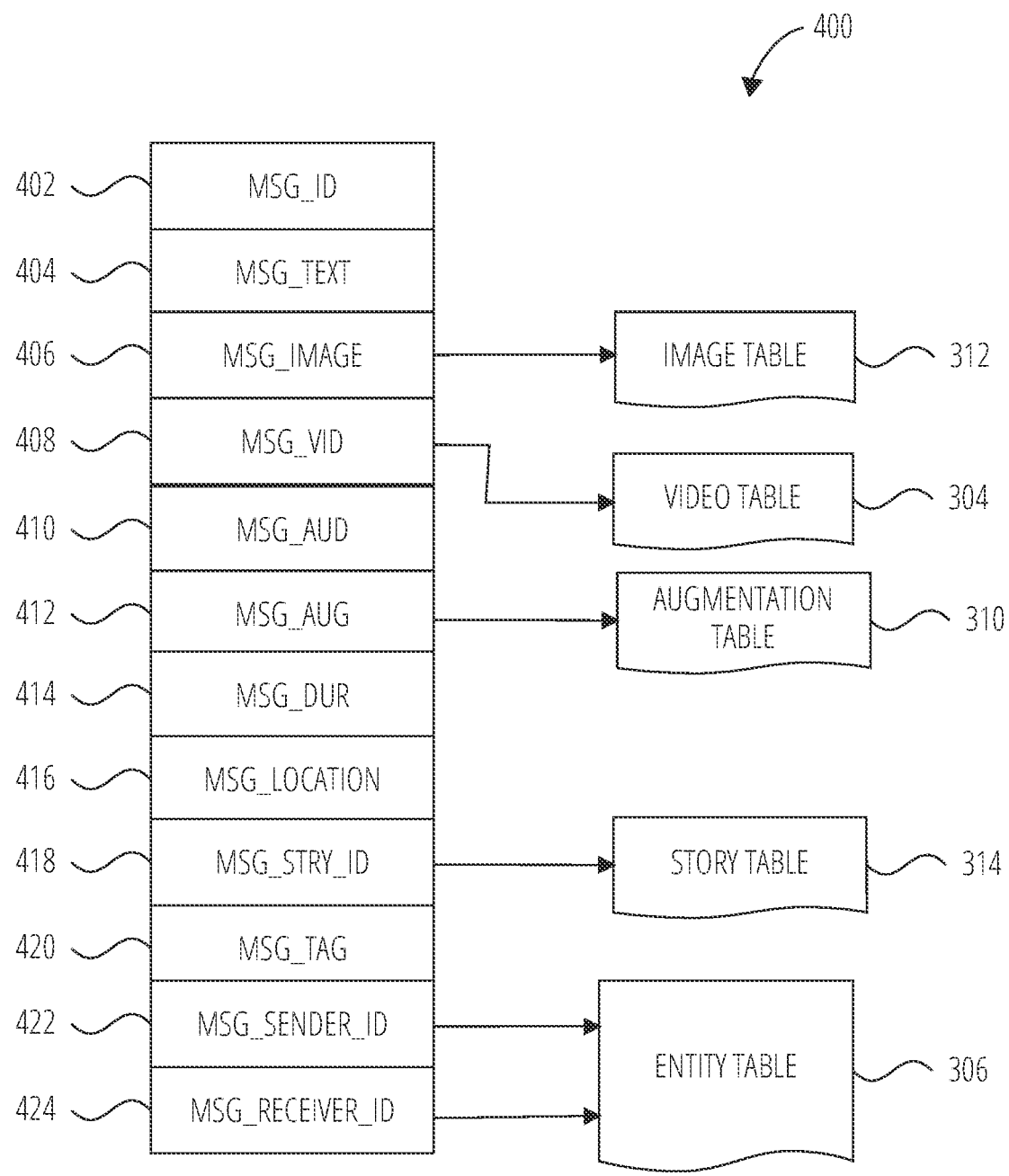
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identities the message 400.
  message text payload 404: text, to be generated by a user via a user interface of the client device 102, and that is included in the message 400.
  message image payload 406: image data, captured by a camera component of a client device 102 or retrieved from a memory component of a client device 102, and that is included in the message 400. Image data for a sent or received message 400 may be stored in the image table 312.
  message video payload 408: video data, captured by a camera component or retrieved from a memory component of the client device 102, and that is included in the message 400. Video data for a sent or received message 400 may be stored in the video table 304.
  message audio payload 410: audio data, captured by a microphone or retrieved from a memory component of the client device 102, and that is included in the message 400.
  message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
  message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 5:
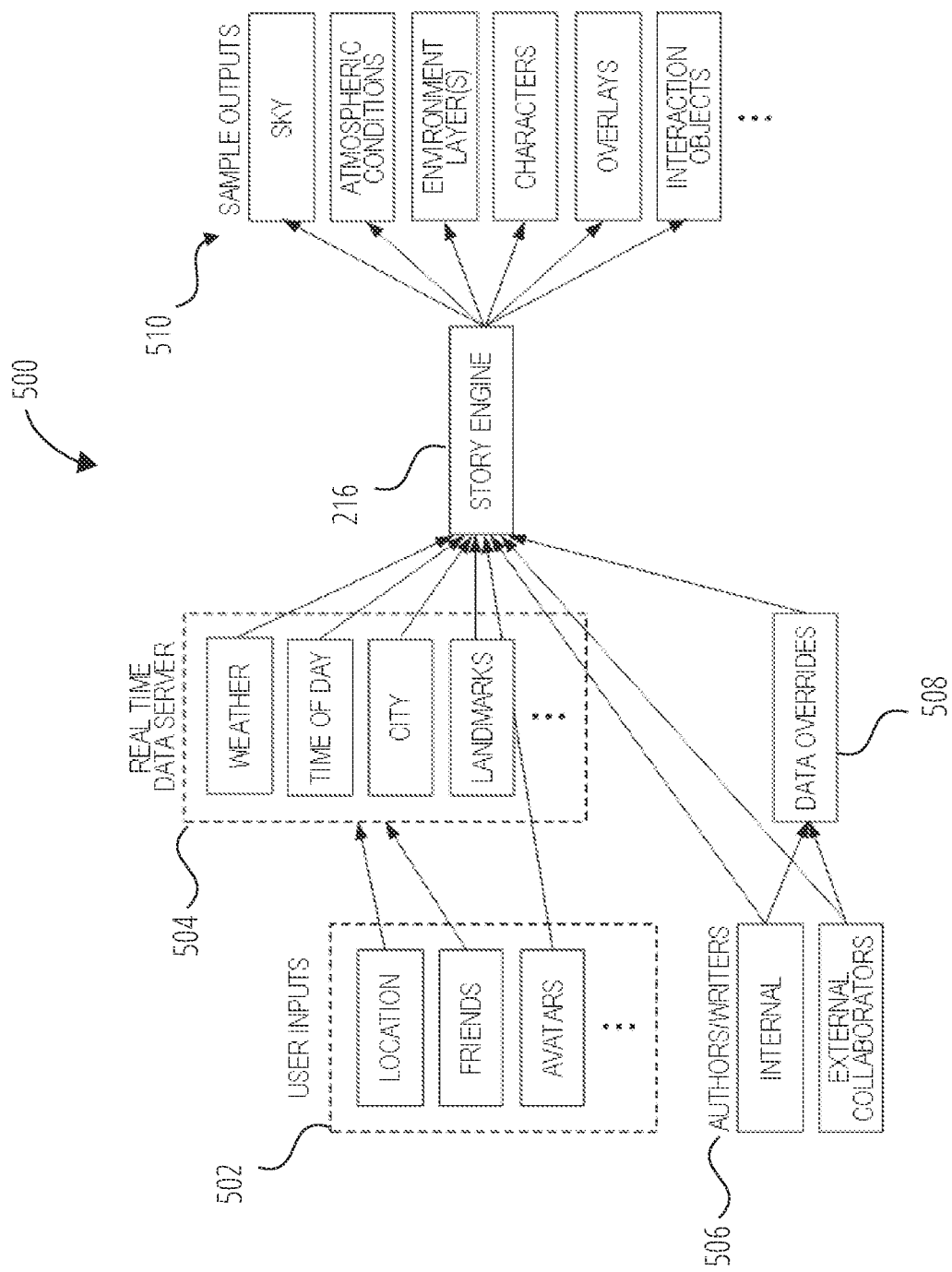
FIG. 5 illustrates an avatar story architecture in accordance with some examples.

FIG. 5 shows is an avatar story architecture 500 showing inputs to and outputs from a story engine 216 in some examples. As can be seen from the figure, inputs to the story engine 216 may come from user inputs 502, real-time data 504, templates or programmatic scripts from authors/writers 506, who may define data overrides 508 (to override any of the other inputs). The story engine 216 operates on these inputs to provide a dynamic (i.e. variable based on the input parameters) avatar story that includes one or more variable outputs 510.

The user inputs 502 or user-specific parameters may be active or passive. An example of an active input might be the affirmative selection by a user of a particular friend to include in the story. Passive inputs can include any contextual information that may be available to the client device 102, including for example location (from position components 936), messaging system friends and associated degrees of relationship (i.e. a "social graph" of best friends, family, colleagues etc.), whether friends are co-located or remote, user and friend avatars, heart rate, heart rate variability, body temperature, time zone and time of day etc.

Based on the user inputs 502/user-specific parameters, a real-time data server can be queried for associated parameters comprising real-time data 504, such as the weather, time of day, city in which the user is located, associated landmarks in the city, etc. As used herein, real-time data refers to data that are representative of a condition that will change over time, such as weather conditions, the location of the user, the general time of day (morning, afternoon, evening, night), etc. Real-time data as used by the story engine 216 or the parameterized avatar system 130 are not required to reflect instantaneous conditions, since the real-time data will have some period of validity before it goes stale. Accordingly, there may be some time between the collection of the real-time data (and data derived therefrom) and its use to generate a story, without negatively impacting presentation of the story to the user. The user inputs 502 and the real-time data 504 are provided to the story engine 216 for use in creating the dynamic avatar story.

Authors/writers 506, who may be internal to the entity providing the messaging system 100 or who may be external contributors or collaborators, define the story template or programmed script, which is then provided to the story engine 216. The authors/writers 506 may define data overrides 508 that define and override selections that would otherwise be made by the story engine 216 based on the user inputs 502 and the real-time data 504. For example, if the story is set it Paris, this could be set as an override for the location data and city determined from the user inputs 502 and real-time data 504, so that a background with the Eiffel Tower is selected rather than a Seattle background if the use is located in Seattle. Similarly, if the story is set in a snowstorm, this could be set as weather override regardless of the weather conditions at the user's location.

The story engine 216 in turn uses the story template as provided by the authors/writers 506 and the user inputs 502 and real-time data 504 as modified by any data overrides 508, to create a dynamic avatar story having a number of sample outputs 510 that may or may not vary based on the various inputs and parameters, depending on the particular story template. By way of example only, the sample outputs may vary in the skyline (e.g. generic rural or city, specific skyline or associated landmarks) or sky (e.g. day or nighttime or dawn or dusk), atmospheric conditions based on the weather at the user's location (e.g. raining, foggy, snowing, sunny etc.) The outputs 510 may include environment layers that define objects in the environment like fire hydrants, specific storefronts (e.g. which may be available for purchase by sponsors or that are located in the user's vicinity), planes writing messages in the sky, etc.

The outputs 510 will also include avatars corresponding to real (i.e. a user or their friends) or fictional characters that may vary in their identity and appearance based on the user inputs 502 and real-time data 504. For example, if the weather is cold the avatars may be warmly dressed and vice versa. If the location is Wall Street, the avatars may be dressed in business attire carrying a briefcase, while if the location is Hawaii in the afternoon and the user is not normally resident there, the avatars may be dressed in beach attire carrying a surfboard or holding a cocktail. Various custom appearances are contemplated based on the real-time data 504, the user inputs 502 and the story template.

The outputs may also include various overlays that are not directly related to the environment but otherwise relate to the story template, for example written comic-strip style sound effects like POW!! or WHAM!! Further, the sample outputs may include interaction objects with which a character in the story interacts, such as a coffee mug on a table, a hook, a bag of money, etc.

Also, in some examples, the story template defines different paths based on the user inputs 502. and real-time data 504. For example, if the user's time of day is the evening, the story could take a scary turn, while if the user's time of day is during the day it can take a funny turn. Similarly, if it is early morning and the user's heart rate is slow, the story could take a more exciting turn, while if it is late and night and the user's heart rate is high, the story could take a more tranquil turn or present more tranquil settings.

In use, the story template is created by the authors/writers 506 as a programmatic script written in for example JavaScript or HTML5. The story template defines a plot defining the parametrized avatar story, which is variably and dynamically presented to the user as defined by the authors/writers 506. The story template is made available to a user of the messaging client 104 on client device 102, for example by the authors/writers 506 uploading it to a server, which may for example be the parameterized avatar system 130 provided as one of the application servers 114 of the messaging system 100, or hosted on a third-party server 110. The story template can then be accessed by the user of the messaging client 104 by searching for or browsing for the story template, or if is provided as a suggestion to the user via the curation interface 206 in the messaging client 104.

When the client device 102 (via user selection in messaging client 104) requests a particular story template, the story template may either be populated by the story engine 216 or by parameterized avatar system 130, or some combination thereof. For example, upon receiving a request from a client device 102 for a particular story template, the parameterized avatar system 130 may query the client device 102 and related sources of relevant data (e.g. social network server 124) to obtain the parameters and inputs relevant to the current state and wishes of the user, their friend group, their environment and other parameters.

Based on these parameters, the parameterized avatar system 130 may then query real-time data servers (e.g. third-party servers 110) to obtain related information based on the parameters, (e.g. the identification of a city corresponding to the user's location, current weather conditions, landmarks, etc.)

Using the user inputs 502 and the real-time data 504, the parameterized avatar system 130 may then assemble the specific media assets required by the story template (e.g. images of skylines or landmarks, customized story characters, relevant objects etc.), populate the story template, and transmit a substantially complete parametrized avatar story for presentation to the user on the client device 102. Alternatively, the parameterized avatar system 130 may assemble a package of assets (based on the user inputs 502 and real-time data 504) that can be used by the story engine 216 to create the parametrized avatar story, and then transmit the package of assets and the story template to the client device 102, where the parametrized avatar story is assembled by the story engine 216 using the story template.

In another example, the story template is provided to the messaging client 104 substantially as-is and the story engine 216 makes appropriate queries, e.g. to the components of the client device 102 to determine local parameters such as location, to the social network server 124 to determine friends and degree of connections, and to real-time data servers to obtain real-time data 504. The story engine 216 can then obtain appropriate assets for use in generating the parametrized avatar story from appropriate sources, e.g. from the parameterized avatar system 130, the collection management system 204, or the social network server 124 or other resource.

In yet another example, the parameterized avatar system 130 provides a package of likely assets to the story engine 216 based on the user inputs 502 and real-time data 504. If the course of, or the assets required by, the parametrized avatar story change as a result of a change in the user inputs 502, real-time data 504 or active user input, additional assets can be obtained by the story engine 216 as needed.

Figure 6:
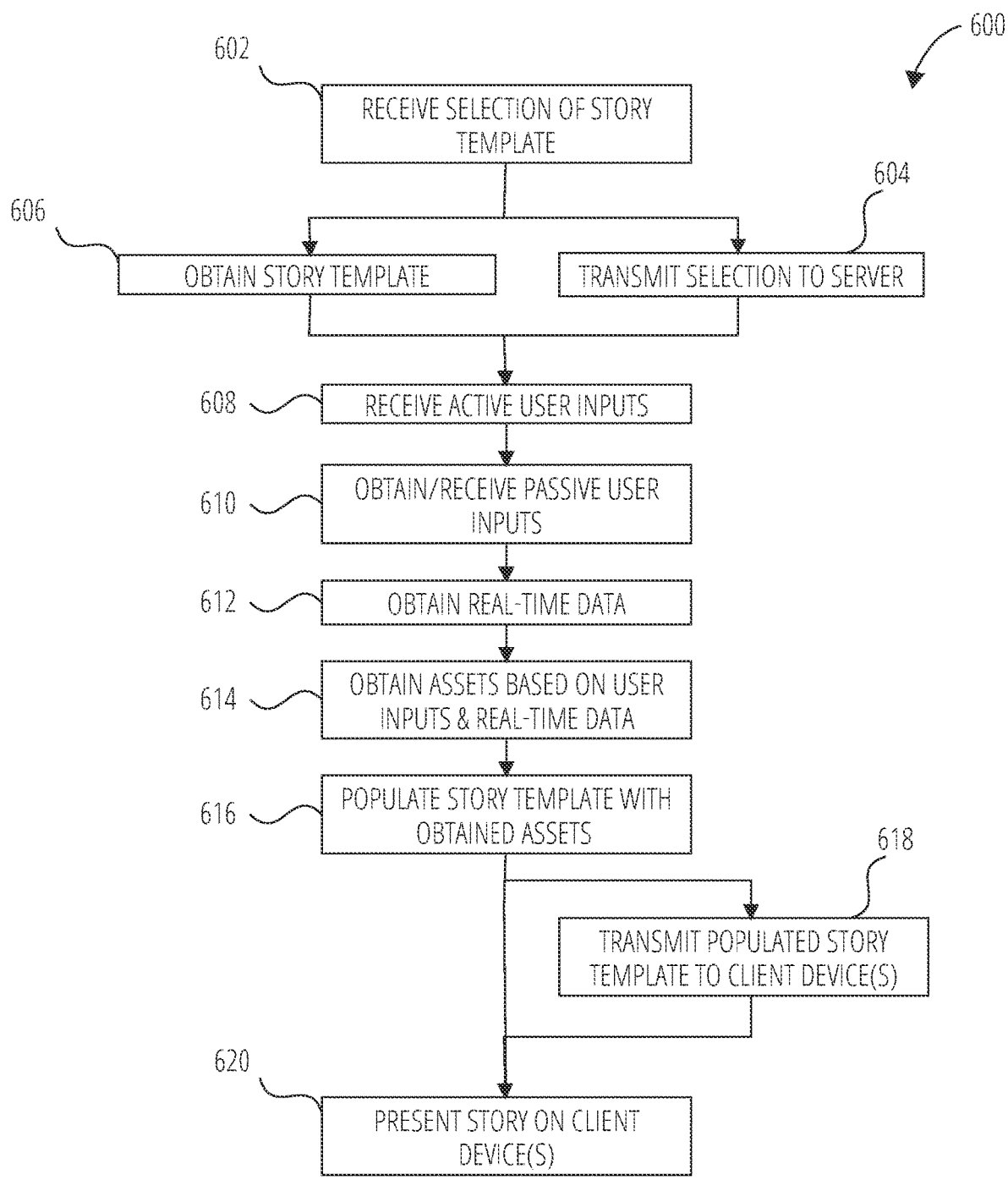
FIG. 6 illustrates a flow diagram of a method for generating parametrized avatar stories in accordance with some examples.

FIG. 6 shows an example flow diagram of a method 600 for generating parametrized avatar stories, according to some examples.

At operation 602, the messaging client 104 (e.g. via story engine 216) receives user selection of a story template uploaded to a server (e.g., a parameterized, dynamic multi-frame, avatar-based comic, uploaded or created using parameterized avatar system 130). Options for browsing and selecting story templates may for example be presented on a client device 102 in the user interface of messaging client 104

In some examples, the story template has template configurations for one or more users of the social network server 124. The story template configurations set an arrangement of how a given user's avatar will appear in a given panel or scene of the story. Additionally, in some examples, the story template contains one or more parametrized attributes of user interface items that can appear in the avatar story. Example parameterized attributes can include which avatars will appear in a given template, which backgrounds to use based on where the client devices of the users are located (e.g., show a Seattle background in the avatar story if the client devices of all the user's appearing in the avatar story are in Seattle via GPS sensors), whether a story is exciting or tranquil, etc. as mentioned above in more detail with reference to FIG. 5.

Depending on the implementation, the selected story template may initially be obtained from the parameterized avatar system 130 by the story engine 216 as shown in operation 606. This is done by the messaging client 104 transmitting an identifier of the selected story template to the parameterized avatar system 130, which responds by transmitting the selected story template to the messaging client 104/client device 102.

Alternatively, the selection of the story template may initially be transmitted to the parameterized avatar system 130 by the story engine 216 as shown in operation 604. This is done by the messaging client 104 transmitting an identifier of the selected story template to the parameterized avatar system 130.

At operation 608, either the story engine 216 or the parameterized avatar system 130 requests and receives active user inputs of user-selectable parameterized attributes options. At operation 610. For example, the user may select one or more of the user's friends to appear in an avatar story, and/or other parameterized attribute options that are available in the story template (e.g., do not include crude jokes or bad language).

At operation 610, either the parameterized avatar system 130 or the story engine 216 obtains passive user inputs by querying the client device 102 and/or any other needed source of passive user inputs, e.g. the social network server 124. As discussed above with reference to FIG. 5, passive user inputs may include location, the identity of friends, closeness of relationships, etc.

At operation 612, either the parameterized avatar system 130 or the story engine 216 obtains real-time data 504 by querying relevant real-time servers (e.g. third-party servers 110) to obtain real-time data 504 based on the user inputs 502.

At operation 614, either the parameterized avatar system 130 or the story engine 216 obtains the digital or media assets required by the story template based on the user inputs 502, the real-time data 504 and the story template itself (e.g. including as specified by any data overrides 508). The assets may for example be obtained from the collection management system 204. The story template is then populated with the obtained assets as shown at operation 616, again either by the parameterized avatar system 130 or the story engine 216. Populating of the story engine 216 can be done in whole or in part, and before or during display of the avatar story, depending on the implementation and also depending on whether the story may vary based on changing user inputs 502 or responses to prompts by the user or a participating friend of the user. In some cases, the most likely story paths and conditions are populated and if there is any deviation, updated assets can be obtained.

At operation 618 (if operation 608 to operation 616 have been performed by the parameterized avatar system 130 based on transmission of a selection of the story template at operation 604) the populated story template is transmitted to the messaging clients 104/client devices 102 of the user and any involved friends. The populated story template may also be published to the social network server 124 for access by other users if specified. If operation if operation 608 to operation 616 have been performed by the story engine 216 based on receipt at the client device 102 of the story template at operation 606, the method proceeds from operation 616 to operation 620.

At operation 620, the parametrized avatar story is then presented on the display of one or more client devices 102. Likely client devices 102 include the client device 102 of the original user who selected the story template at operation 602., as well as client devices 102 of one or more viewing users who are friends of the original user and who have either been invited by the original user (via their respective messaging clients 104) to download or receive the story, or have seen and downloaded the story from the social network server 124.

Figure 7:
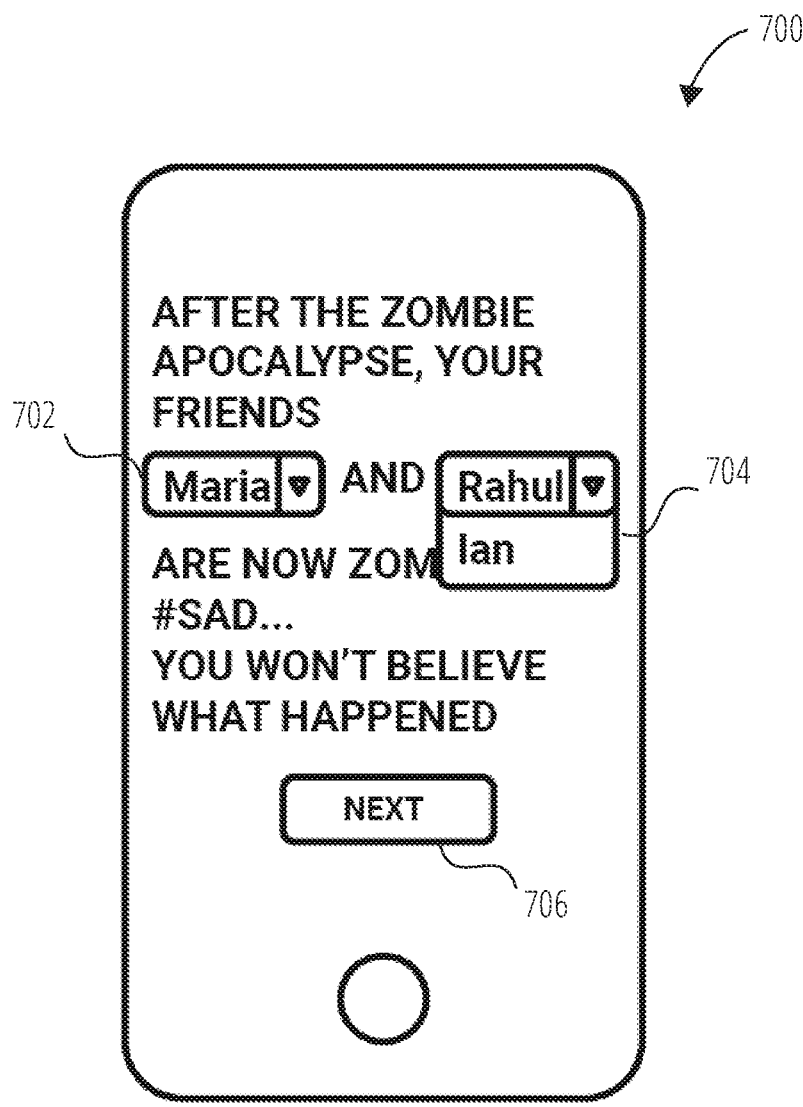
FIG. 7 illustrates a user interface for selecting parameters in accordance with some examples.

FIG. 7 shows an example user interface 700 for selecting parameters, according to some examples. The user interface 700 can be displayed on the original user's device when the original user is explicitly setting parameters, such as specified users, to include in the parameterized avatar story. For example, the posting user can select a first friend from dropdown 702 and a second friend from dropdown 704 to select their respective avatar data to be included in the avatar story. The original user then selects the next button 706 to provide the selected parameters to the story engine 216 or the parameterized avatar system 130.

In some examples, parameters are selected implicitly by the avatar story template and social network graph data of the users on social network server 124. For example, if a given avatar story template is romantic in nature (e.g., has a metadata tag of "romantic", as in a love themed avatar story), the posting user may not be invited to select the other user to be included in the parameterized avatar story; instead, the story engine 216 may access social graph data and selects another user that is romantically close to the posting user (e.g., as determined by a quantity of heart emojis or other romantically themed media) sent between the users, or by an identified relationship status between the two users).

Figure 8:
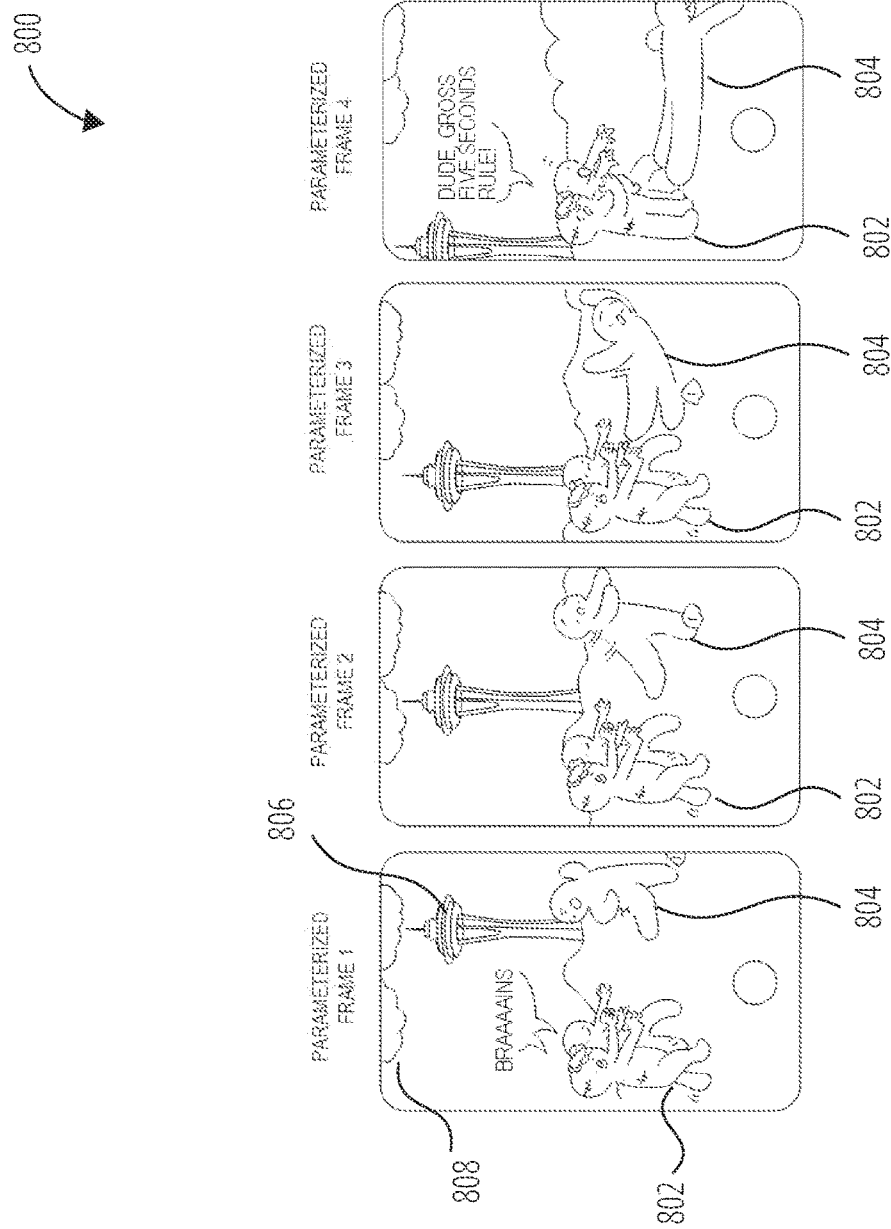
FIG. 8 illustrates a populated parameterized avatar story in accordance with some examples.

FIG. 8 shows an example populated parameterized avatar story 800, according to some examples. In the example illustrated, the avatar story 800 has four scenes, frames or panels (e.g., parameterized panels 1-4) that progress in accordance with a sequence defined in the avatar story template. The two user avatars 802 are the avatars of users expressly selected via the posting user (e.g. in FIG. 7) or selected automatically based on social graph data between the users and the original user. The original user avatar 804 is depicted as running from the other two user avatars 802 in front of a city background 815 (e.g., Seattle), which may be selected based on one or all of the users (e.g., the two users and the posting users) all having client devices within the city limits of Seattle. As an additional example, if one of the users is not located in Seattle, the parametric avatar story 800 can be populated with the city background 806 of whichever city or region the posting user is located as described above. The city background 806 may for example include distinctive buildings or monuments associated. with the region or background, for example the Space Needle in Seattle in the illustrated example.

Many variations are possible based on the user inputs 502, real-time data 504 and related information. For example, the sky 808 may reflect current weather conditions (partly cloudy in the illustrated example) in Seattle and the appearance of the avatars may vary and be customized accordingly, for example warmly dressed if it is cold or with rain gear if it is raining. The lighting of the scene and associated presence or absence of the sun or moon may also vary depending on the time of day in the Pacific time zone in the illustrated example.

Machine Architecture

Figure 9:
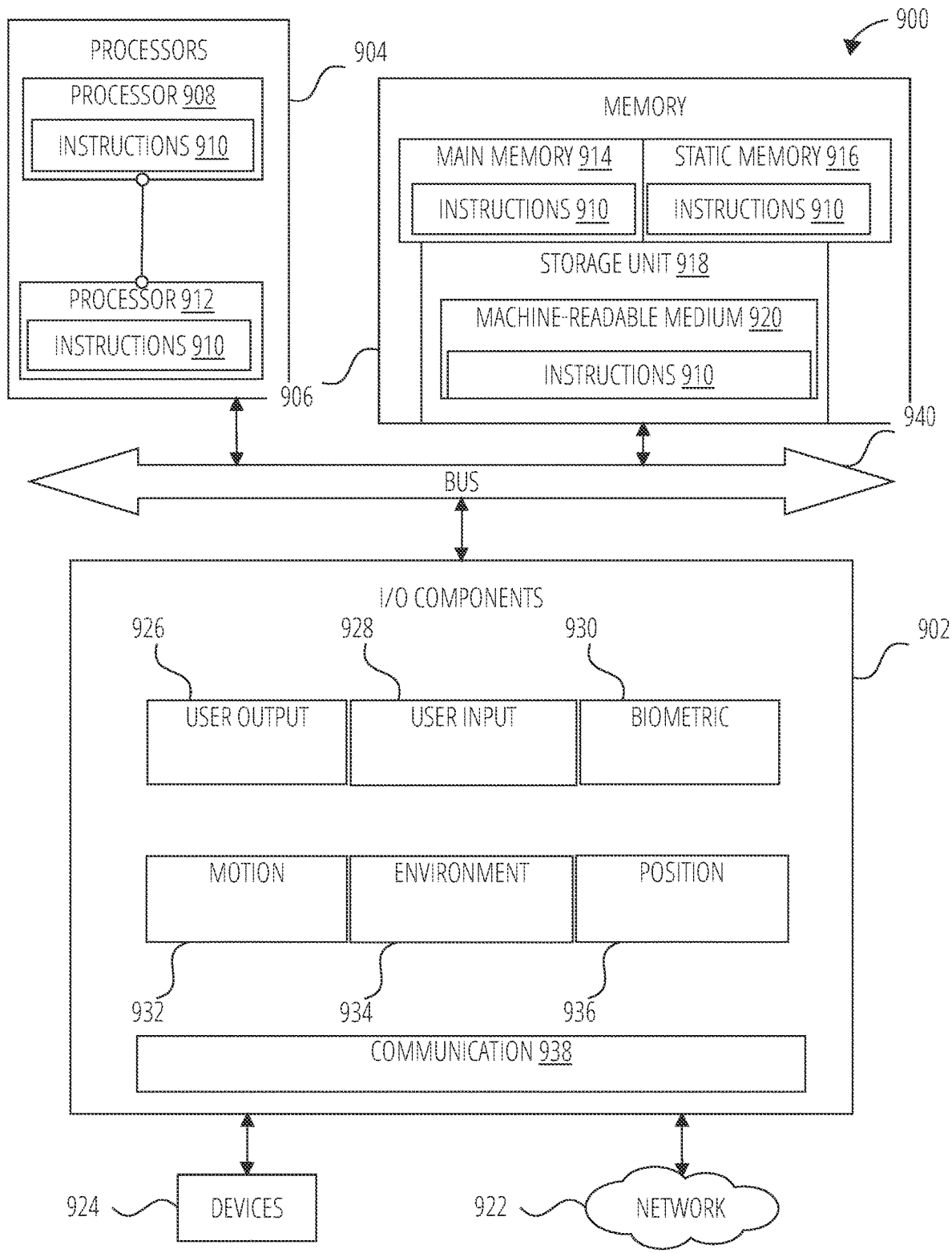
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 910 (e.g., software, a program, an application, an applet, an app, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output components 902, which may be configured to communicate with each other via a bus 940. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, both accessible to the processors 904 via the bus 940. The main memory 906, the static memory 916, and storage unit 91$ store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the Processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include user output components 926 and user input components 928. The user output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

The environmental components 934 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 936 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 938 operable to couple the machine 900 to a network 922 or devices 924 via respective coupling or connections, example, the communication components 938 may include a network interface Component or another suitable device to interface with the network 922. In further examples, the communication components 938 may include wired communication components, wireless communication components, cellular communication components. Near Field Communication (NFC) components, Bluetooth® components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

Software Architecture

Figure 10:
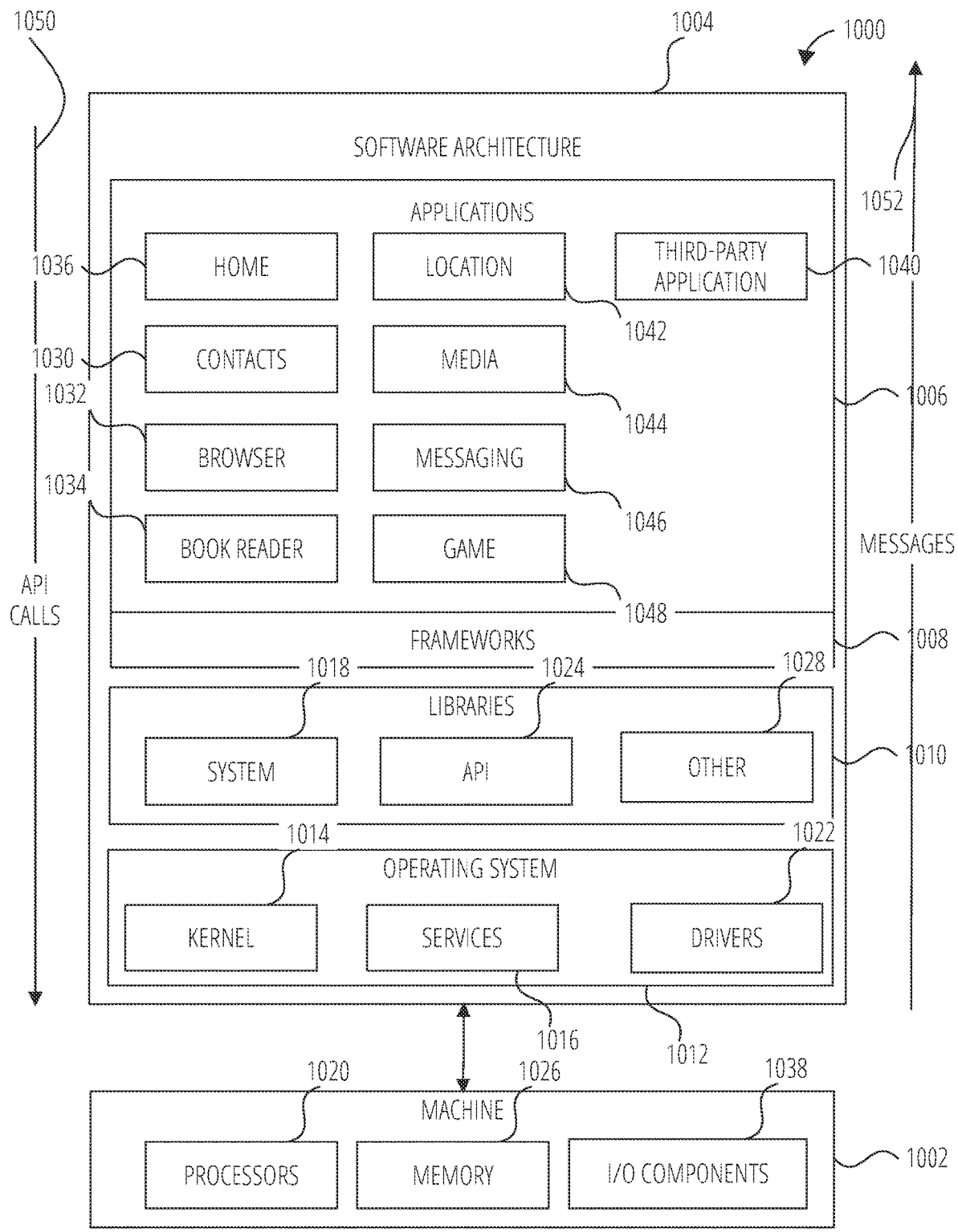
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG). or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1020 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/ modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, performed by a computer system, the method comprising:
    determining, by the computer system, user-specific parameters relating to a user;
    retrieving, by the computer system, real-time data based at least in part on the user-specific parameters;
    obtaining, by the computer system, specific media based on at least one of the real-time data and user-specific parameters;
    generating, by the computer system, a media collection by combining a media collection template and the specific media; and
    displaying, by the computer system, the media collection, wherein the user-specific parameters include a location of the user and the specific media includes a representation of landmarks near the location.

2. The method of claim 1 wherein the user-specific parameters include a location of the user, the real-time data includes weather conditions at the location, and the specific media includes a representation of the weather conditions.

3. The method of claim 1, further comprising:
    receiving user inputs from a device associated with the user; and
    varying the media collection based on the user inputs.

4. The method of claim 1, wherein the media collection comprises a plurality of story elements.

5. A method, performed by a computer system, the method comprising:
    determining, by the computer system, user-specific parameters relating to a user;
    retrieving, by the computer system, real-time data based at least in part on the user-specific parameters;
    obtaining, by the computer system, specific media based on at least one of the real-time data and user-specific parameters, wherein the specific media includes a custom appearance of an avatar corresponding to the user, the custom appearance of the avatar being based on the real-time data;
    generating, by the computer system, a media collection by combining a media collection template and the specific media; and
    displaying, by the computer system, the media collection.

6. A method, performed by a computer system, the method comprising:
　determining, by the computer system, user-specific parameters relating to a user;
　retrieving, by the computer system, real-time data based at least in part on the user-specific parameters;
　obtaining, by the computer system, specific media based on at least one of the real-time data and user-specific parameters;
　generating, by the computer system, a media collection by combining a media collection template and the specific media; and
　displaying, by the computer system, the media collection, wherein the media collection template includes a data override that specifies a value for the real-time data that is different from a value of the real-time data based on a user-specific parameter.

7. A method, performed by a computer system, the method comprising:
　determining, by the computer system, user-specific parameters relating to a user;
　retrieving, by the computer system, real-time data based at least in part on the user-specific parameters;
　obtaining, by the computer system, specific media based on at least one of the real-time data and user-specific parameters;
　generating, by the computer system, a media collection by combining a media collection template and the specific media; and
　displaying, by the computer system, the media collection, wherein the media collection includes representations of a participating friend of the user, the method further comprising:
　　receiving inputs from a user device of the participating friend of the user; and
　　varying the media collection based on the inputs received from the user device of the participating friend.

8. A system comprising:
　one or more processors of a machine; and
　a memory storing instructions for providing a media collection, the instructions when executed by at least one processor among the one or more processors, causes the machine to perform operations comprising:
　determining user-specific parameters relating to a user;
　retrieving real-time data based at least in part on the user-specific parameters;
　obtaining specific media based on at least one of the real-time data and user-specific parameters;
　generating the media collection by combining a media collection template and the specific media; and
　displaying the media collection,
wherein the media collection template includes a data override that specifies a value for the real-time data that is different from a value of the real-time data based on a user-specific parameter.

9. The system of claim 8 wherein the user-specific parameters include a location of the user, the real-time data includes weather conditions at the location, and the specific media includes a representation of the weather conditions.

10. The system of claim 8 wherein the operations further comprise:
　receiving user inputs from a device associated with the user; and
　varying the media collection based on the user inputs.

11. A system comprising:
　one or more processors of a machine; and
　a memory storing instructions for providing a media collection, the instructions when executed by at least one processor among the one or more processors, causes the machine to erform operations comprising:
　determining user-specific parameters relating to a user;
　retrieving real-time data based at least in part on the user-specific parameters;
　obtaining specific media based on at least one of the real-time data and user-specific parameters;
　generating the media collection by combining a media collection template and the specific media; and
　displaying the media collection,
wherein the user-specific parameters include a location of the user and the specific media includes a representation of landmarks near the location.

12. A system comprising:
　one or more processors of a machine; and
　a memory storing instructions for providing a media collection, the instructions when executed by at least one processor among the one or more processors, causes the machine to perform operations comprising:
　determining user-specific parameters relating to a user;
　retrieving real-time data based at least in part on the user-specific parameters;
　obtaining specific media based on at least one of the real-time data and user-specific parameters;
　generating the media collection by combining a media collection template and the specific media; and
　displaying the media collection,
wherein the specific media includes a custom appearance of an avatar corresponding to the user, the custom appearance of the avatar being based on at least one of the user-specific parameters and the real-time data.

13. A system comprising:
　one or more processors of a machine; and
　a memory storing instructions for providing a media collection, the instructions when executed by at least one processor among the one or more processors, causes the machine to perform operations comprising:
　determining user-specific parameters relating to a user;
　retrieving real-time data based at least in part on the user-specific parameters;
　obtaining specific media based on at least one of the real-time data and user-specific parameters;
　generating the media collection by combining a media collection template and the specific media; and
　displaying the media collection,
wherein the media collection includes representations of a participating friend of the user, the operations further comprising:
　receiving inputs from a user device of the participating friend of the user; and
　varying the media collection based on the inputs received from the user device of the participating friend.

14. One or more non-transitory machine-readable storage media embodying instructions for providing a media collection, the instructions, when executed by one or more devices, cause the devices to perform operations comprising:
　determining user-specific parameters relating to a user;
　retrieving real-time data based at least in part on the user-specific parameters;
　obtaining specific media based on at least one of the real-time data and user-specific parameters;
　generating the media collection by combining a media collection template and the specific media; and
　displaying the media collection, wherein the user-specific parameters include a location of the user and the specific media includes a representation of landmarks near the location.

15. The one or more machine-readable storage media of claim 14 wherein the user-specific parameters include a location of the user, the real-time data includes weather conditions at the location, and the specific media includes a representation of the weather conditions.

16. The one or more machine-readable storage media of claim 14 wherein the operations further comprise:
   receiving user inputs from a device associated with the user; and
   varying the media collection based on the user inputs.

17. One or more non-transitory machine-readable storage media embodying instructions for providing a media collection, the instructions, when executed by one or more devices, cause the devices to perform operations comprising:
   determining user-specific parameters relating to a user;
   retrieving real-time data based at least in part on the user-specific parameters;
   obtaining specific media based on at least one of the real-time data and user-specific parameters;
   generating the media collection by combining a media collection template and the specific media; and
   displaying the media collection,
wherein the media collection template includes a data override that specifies a value for the real-time data that is different from a value of the real-time data based on a user-specific parameter.

18. One or more non-transitory machine-readable storage media embodying instructions for providing a media collection, the instructions, when executed by one or more devices, cause the devices to perform operations comprising:
   determining user-specific parameters relating to a user;
   retrieving real-time data based at least in part on the user-specific parameters;
   obtaining specific media based on at least one of the real-time data and user-specific parameters;
   generating the media collection by combining a media collection template and the specific media; and
   displaying the media collection,
wherein the media collection includes representations of a participating friend of the user, the operations further comprising:
   receiving inputs from a user device of the participating friend of the user; and
   varying the media collection based on the inputs received from the user device of the participating friend.

* * * * *

UNITED STATES PATENT AND TRADEMARK OFFICE
CERTIFICATE OF CORRECTION

PATENT NO. : 11,676,320 B2
APPLICATION NO. : 17/583988
DATED : June 13, 2023
INVENTOR(S) : Monroy-Hernández et al.

It is certified that error appears in the above-identified patent and that said Letters Patent is hereby corrected as shown below:

On the Title Page

On page 2, in Column 2, Item (56) under "U.S. Patent Documents", Line 51, delete "2005/0020661" and insert --2005/0206610-- therefor In the Claims In Column 32, Line 4, in Claim 11, delete "erform" and insert --perform-- therefor Signed and Sealed this
Twenty-ninth Day of October, 2024

Katherine Kelly Vidal
*Director of the United States Patent and Trademark Office*